D. L. FAWCETT.
BRIQUETING, PRESSING, OR BRICKMAKING MACHINE.
APPLICATION FILED APR. 11, 1911.

1,004,399.
Patented Sept. 26, 1911.

Witnesses,
Harry G. Corcoran
E. S. Corcoran

Inventor,
David L. Fawcett.
by Herbert W. J. Jenner.
Attorney

COLUMBIA PLANOGRAPH CO., WASHINGTON, D. C.

UNITED STATES PATENT OFFICE.

DAVID LADLEY FAWCETT, OF LEEDS, ENGLAND.

BRIQUETING, PRESSING, OR BRICKMAKING MACHINE.

1,004,399.  Specification of Letters Patent.  Patented Sept. 26, 1911.

Application filed April 11, 1911. Serial No. 620,468.

*To all whom it may concern:*

Be it known that I, DAVID LADLEY FAWCETT, a subject of King George V of Great Britain, residing at Leeds, in the county of York, England, have invented certain new and useful Improvements in Briqueting, Pressing, or Brickmaking Machines, of which the following is a specification.

This invention relates to briqueting, pressing or brick making machines of the type in which a cylinder or barrel having openings or recesses in its periphery to receive molds or the like is intermittently rotated to present such molds successively opposite a horizontally reciprocating ram or rams which force or press into each mold a charge of cement-compo or semi-dry or plastic substance or composition, each mold having therein a movable die or plate connected with a die or plate in the mold diametrically opposite thereto so that as one mold is filled the die or plate in the mold diametrically opposite the same is moved to the outer end of its respective mold to discharge the molded block or brick therefrom.

Heretofore the cylinder or barrel has been intermittently rotated in a direction opposite to the movement of the hands of a clock and the dies or plates after delivery of a pressed block or brick from the mold in horizontal alinement with the mold being charged, have on reaching the lowest position of the cylinder or barrel, been forced slightly inwardly to partly move out the opposite die or plate and molded block ready for complete discharge, and leave a small cavity in the lowest mold ready for the clay, cement-compo or other semi-dry or plastic substance or composition being rammed into same when brought into alinement with the ram or rams.

I have found in practice that the working of the machine as above set forth is unsatisfactory and causes irregular and inferior results by reason of improper feeding of the clay or like substance to the molds, and also of the obstruction of the free movement of the dies or plates through any cause whatever, and the object of my present invention is to provide an improved arrangement, construction and working of the parts to avoid the objectionable features of the present machines.

The novel features of my invention will be fully described in the subjoined specification and particularly pointed out in the following claims.

Figure 1:
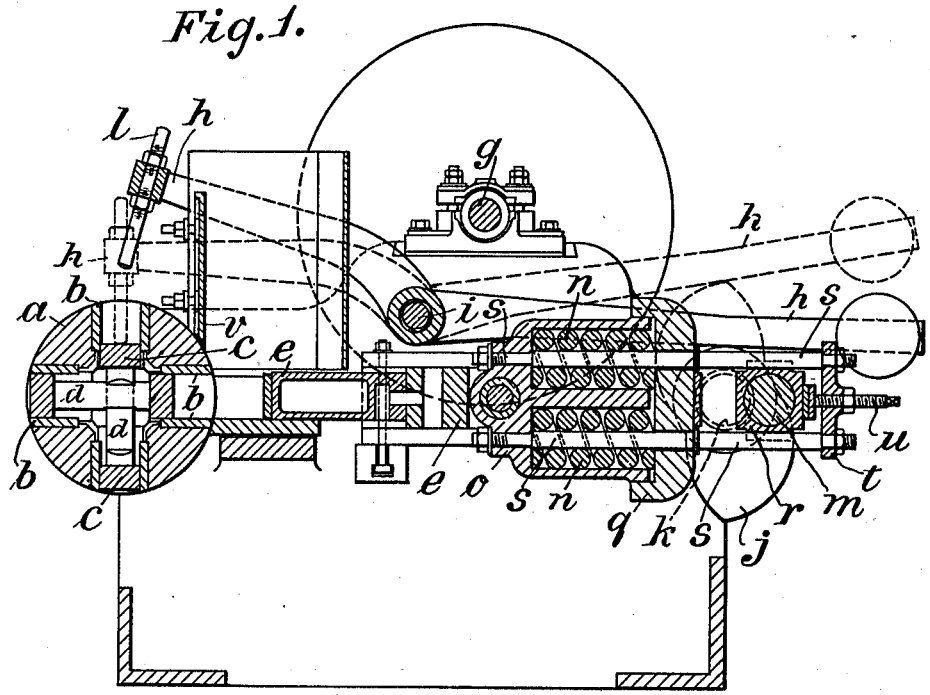
Figure 2:
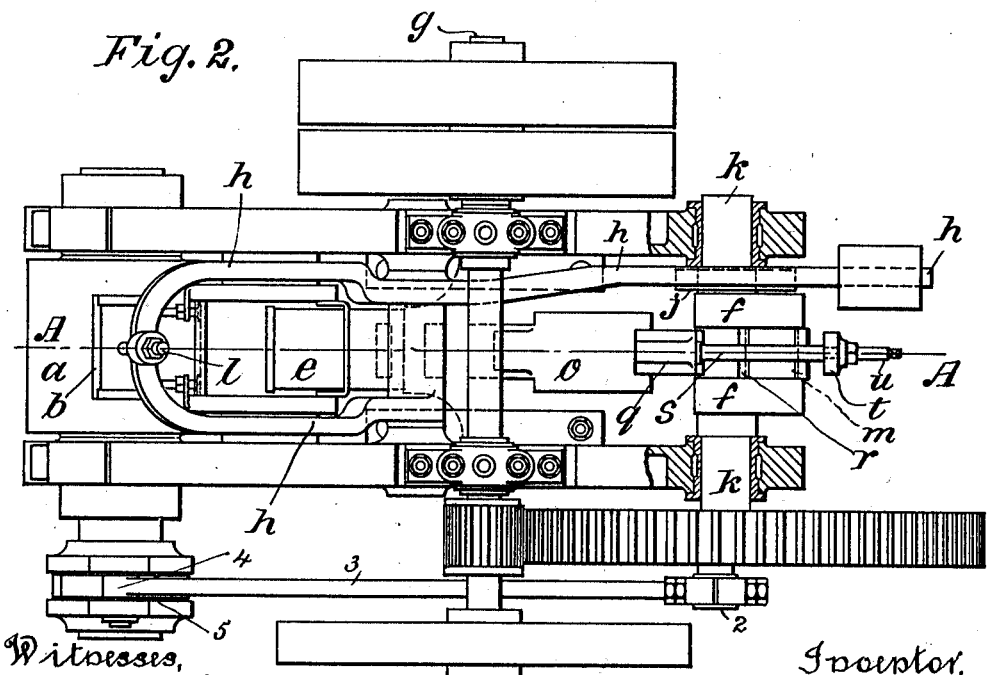

Figure 1 is a vertical section of a machine of the type referred to, having the improvements applied, the plane of the section being that of the line A, A, Fig. 2, which latter figure is a plan view of the machine.

Referring to the drawings, $a$ is the cylinder or barrel having openings in its periphery to receive molds $b$, each opening having therein a movable plate or die $c$ connected with the die or plate in the opening diametrically opposite thereto by a rod $d$, the rod connecting one pair of dies or plates passing through an opening in the rod connecting the other pair of dies or plates. The cylinder or barrel $a$ is intermittently rotated to present one of the openings $b$ opposite a plunger or ram $e$ which is reciprocated by means of a crank $f$ driven by gearing from the main or driving shaft $g$ of the machine.

Heretofore the barrel $a$ has been intermittently rotated in a direction opposite to the hands of a clock, that is to say, a filled mold has at the next partial rotation immediately following the filling thereof, been carried to the top, and the die or plate diametrically opposite to that of the filled mold has been forced slightly inwardly or upwardly to partly move out the opposite die or plate and thus partly force outwardly in an upward direction the pressed block, the partial upward movement of the lower die or plate leaving a corresponding small cavity in the mold at the bottom. At the next partial rotation of the barrel, the mold which was at the bottom was carried opposite the ram and the forcing of clay or like material into such mold completed the forcing out of the previously pressed block referred to from the diametrically opposite mold.

As previously stated, this method of working or arrangement of the machine has been found to be unsatisfactory, and the object of the present invention is to improve upon such arrangement or method of working.

According to the invention, the cylinder or barrel $a$ is arranged to be intermittently rotated in a direction opposite to that which has hitherto been customary, that is to say, it is revolved in a direction to carry the mold containing the last pressed block in a downward direction so as to present it, by the next partial rotation of the cylinder or barrel, at the bottom instead of at the top thereof as hitherto, the rotation of the barrel in the direction specified admitting of a better feed of clay or the like to the molds.

The barrel a is revolved intermittently by any approved driving mechanism such as a crank 2 driven by the crankshaft k, and a rod 3 pivoted to the crank 2 and having a hook 4 at its free end portion, which hook engages with a ratchet toothed wheel 5 secured on the barrel shaft.

A lever h suitably pivoted on a cross shaft i and operated by a cam j on the crank shaft k is provided with an adjustable pin or stud l which is adapted, as said lever is actuated at the proper time by the cam, to enter the opening or mold presented at the top and to force the die or plate therein to the bottom of said opening, thus forcing out the opposite die or plate at the bottom of the barrel and forcing the pressed block out of the mold from whence said block falls by gravity clear of the barrel.

In order to prevent the production of unevenly pressed blocks due to irregularities in the material fed to the machine, and to compensate for any obstruction which may be offered to the proper working of the ram e, a yielding connection is provided between the said ram and the crank pin m from which it is operated, the yielding connection being obtained by making the connecting rod in two parts and interposing between such parts suitable springs, rubber blocks, or pneumatic or hydraulic cushions. In the instance shown, the yielding connection is obtained by means of springs n, n interposed between the block o pivoted to the ram e, and a plate q adapted to be engaged by the sliding block r on the crank pin m. As the said crank pin revolves the block r thereon presses on the plate q and the springs n, n transmit the pressure to the ram, a sufficient amount of play being left between the block r and plate q to allow of the springs yielding sufficiently if any obstruction is presented to the proper movement of the ram into the mold. The ram is drawn back out of the mold by rods s, s attached to the block o and having fast on their outer ends a plate t carrying an adjusting screw u with the head of which the block r on the crank pin engages. Adjustment of the screw u regulates the length of stroke given to the ram e as will be understood.

In forcing the upper die or dies or plates inwardly to the full extent immediately before the respective mold or molds is or are presented opposite the ram or rams, there is no possible chance of the full charge of clay or other substance or composition into the mold being obstructed and faulty blocks or bricks produced, or the effective working of the machine interfered with.

The side plate v of the hopper is adjustable so that it may be placed nearer to or farther from the center of the barrel according to the kind of clay or the like being dealt with, the adjustment of said side plate farther to the left in Fig. 1 allowing the substance in the hopper to pass at an earlier moment into the molds as they are approaching the position opposite the ram.

Two or more molds may be provided side by side in the barrel instead of only one mold as shown, the ram being shaped accordingly and the lever h provided with a pin or stud for each mold. If the molds are of the globular or semi-globular type, I insert hard steel rings or liners in the openings in the cylinder or barrel and secure them in position by screws the said liners or rings being easily removable when worn to admit of fresh liners being inserted.

Having thus described my invention, what I claim and desire to secure by Letters Patent is:—

1. In a briquet or brick making machine, the combination with a ram, of yielding means connected with the crank shaft for driving such ram, a cylinder or barrel having molds and pairs of diametrically connected dies and rotated intermittently in a clockwise direction, a pivoted lever extending over the barrel or cylinder and having an adjustable pin or pins adapted to engage and force downwardly the die or dies presented at the top of the barrel and expel the pressed block or blocks from the diametrically opposite mold or molds presented at the bottom of the cylinder or barrel, and means for actuating said lever.

2. In a briquet or brick making machine, the combination of a ram, yielding driving connections therefor, a cylinder or barrel containing molds with dies movable therein and rotating in a clockwise direction, a pivoted cam actuated lever operating from above the barrel to force the dies successively downwardly and discharge the pressed briquet or block from the lowest mold, and an adjustable side plate on the side of the hopper adjacent the barrel to admit the material at an earlier moment than when the mold is in alinement with the ram.

In testimony whereof I affix my signature in the presence of two witnesses.

DAVID LADLEY FAWCETT.

Witnesses:
JAMES DAWSON FAWCETT,
THOMAS H. BARRON.